United States Patent [19]
Gemmill, Sr. et al.
[11] 4,020,351
[45] Apr. 26, 1977

[54] GENERATOR SYSTEM

[75] Inventors: Wayne Joseph Gemmill, Sr., Milford, Pa.; Frank Ernest Cerone, Jr., Marlboro, N.Y.

[73] Assignee: Union Carbide Corporation, New York, N.Y.

[22] Filed: June 16, 1975

[21] Appl. No.: 587,263

[52] U.S. Cl. .......................... 250/432 PD; 250/328

[51] Int. Cl.² .................... G01T 1/00; G01N 21/24

[58] Field of Search .......... 250/432, 506, 435, 428, 250/432 PD, 328

[56] References Cited

UNITED STATES PATENTS 3,655,981 4/1972 Montgomery et al. ...... 250/432 PD
3,774,035 11/1973 Litt ............................ 250/432 PD

*Primary Examiner*—Harold A. Dixon
*Attorney, Agent, or Firm*—William Raymond Moran

[57] ABSTRACT

A system is provided for the production of sterile, non-pyrogenic isotonic solutions of sodium pertechnetate. The system is comprised of a portable apparatus having contained in one unit a shielded column containing molybdenum-99 from which the technetium 99m is eluted, a reservoir of sterile isotonic saline solution, conduit means for transferring the solution to and from the column and dispensing the eluted radioisotope into a shielded vial from which the physician can extract the required amount.

13 Claims, 3 Drawing Figures

GENERATOR SYSTEM

This invention relates in general to a system for generating radioisotopes. In one aspect, the invention is directed to a system for eluting technetium-99m from its parent isotope, molybdenum-99. In a further aspect, this invention relates to a compact portable unit which dispenses a sterile, non-pyrogenic, isotonic solution containing technetium-99m.

In recent years there has been a marked increase in the use of radiosotopes, particularly in industrail applications such as in the measurement of flow rates, process control, radiometric chemistry and the like. Radioisotopes are also of current interest in medical research and as diagnostic agents. For example, medical investigation has shown that radioisotopes, such as technetium-99m, are extremely useful tools for diagnosis. High purity technetium-99m is used as a radioisotope in a variety of medical research and diagnosis. It is well suited for liver, lung, blood pool and tumor scanning, and is preferred over other radioactive isotopes because of its short half-life which results in reduced exposure of the organs to radiation.

Since the radioisotopes which are used have relatively short half-lives, it is the common practice to ship the user the parent element. The user than extracts the desired isotope as his needs require. For example, technetium-99m can be shipped to the user as its parent element, i.e. fission product molybdenum-99. When the radioisotope is desired, the technetium-99m can be eluted from the parent element. Due to the relatively high degree of radioactivity, elaborate precautions must be taken to insure proper shielding from body the parent element and the eluted radioisotope. Lead containers are commonly employed for the storage and transportation of the radioactive materials. Hence the use of the radioisotopes is largely limited to scientists who have been trained in the special handling techniques required to minimize the hazards inherently present.

However, prior to the present invention the type of systems provided to industrial sites, hospitals, research centers and the like were usually cumbersome and comprised of many individual parts. It was necessary to assemble the various components such as the generator column, eluant reservoir, and receiving vial, while observing the necessary precautions involved with the use of radioactive compositions. This was particularly important with the increasing use of fission product molybdenum-99 which has a markedly higher specific activity over the corresponding neutron irradiated molybdenum.

Accordingly, one or more of the following objects will be achieved by the practice of this invention. It is an object of this invention to provide a generator system for the production of sterile, non-pyrogenic, isotonic solutions of sodium pertechnetate. Another object of this invention is to provide a compact, portable unit from which radioisotopes can be conveniently and safely eluted. A further object of this invention is to provide a column which is designed to provide the necessary shielding and yet minimizes the weight usually associated with each columns. A still further object of this invention is to provide a system which contains all the essential components for generating radioisotopes. These and other objects will readily become apparent to those skilled in the art in the light of the teachings herein set forth.

The objects of the invention and the preferred embodiments thereof will best be understood by reference to the accompanying drawing wherein FIG. 1 is a perspective view of the the generator system of this invention and shows the shielded vial into which the radioisotope is dispensed.

Figure 1:
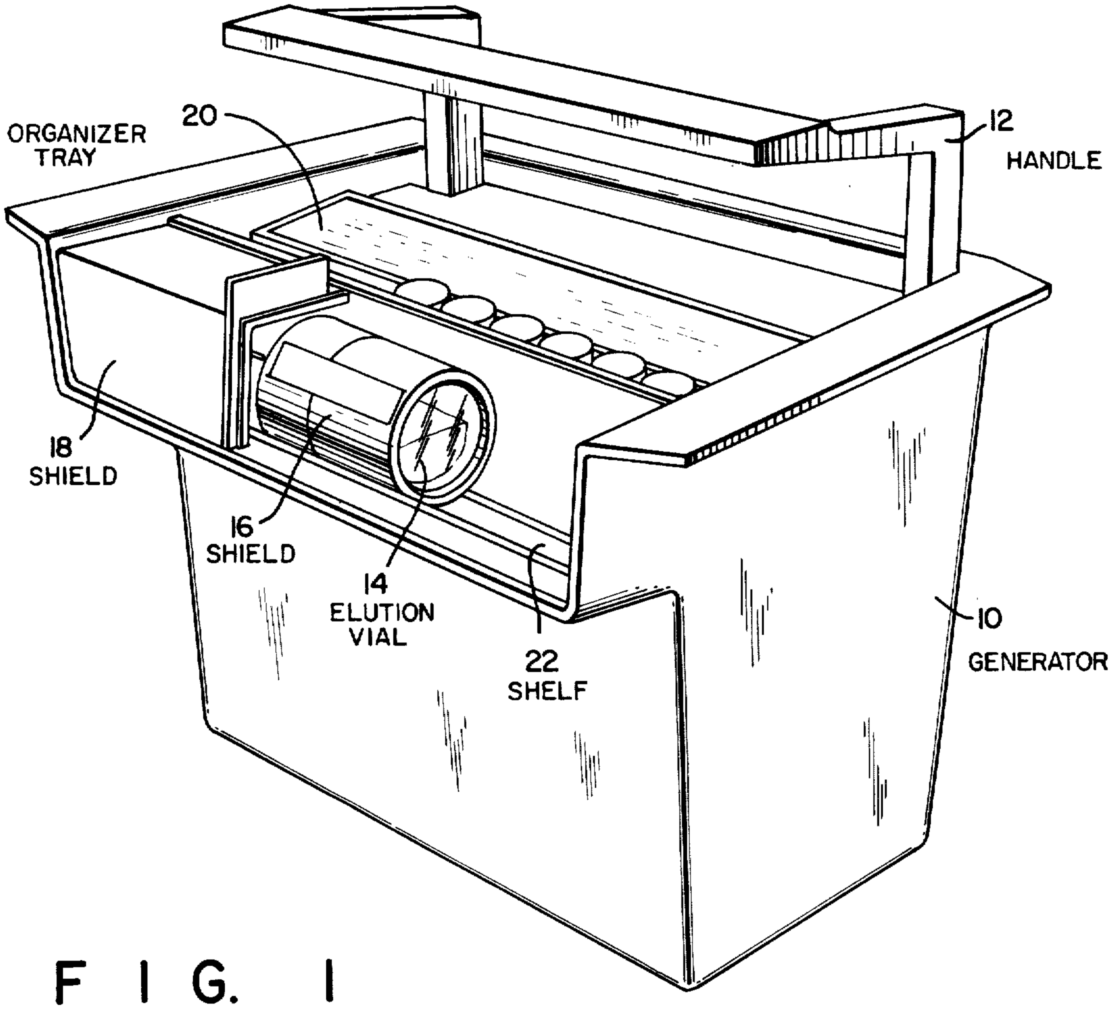

With further reference to the drawings, the generator system 10 is depicted in FIG. 1. Handle 12 is disposed to facilitate removal of the shielded generator and eluant reservoir from the system. Elution vial 14 is contained within shield 16 and can have a window through which the vial can be observed. Shield 18 covers the dispensing mechanism which is comprised of the conduit from the generator, filter and dispensing needle. Shield 18 can be hinged on its upper edge where it joins organizer tray 20 to afford easy access to filter and dispensing needle. Alternatively, shield 18 can be slidably mounted so that it can transverse the length of the unit along shelf 22 and be used to further shield the elution vial.

Figure 2:
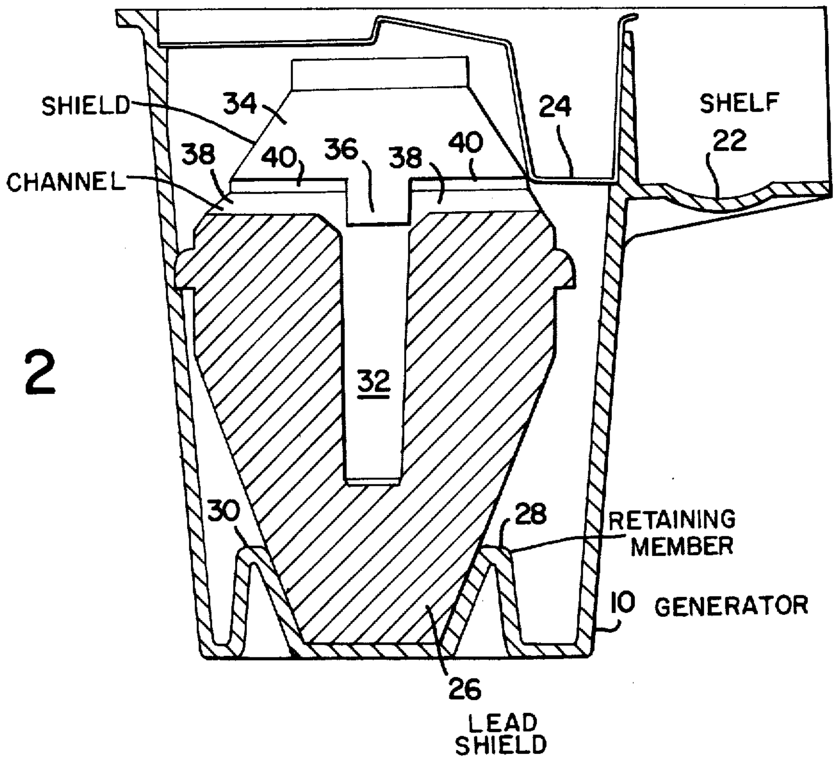
FIG. 2 is a cross-sectional view taken through the left side of the unit and shows the shielded column from which the parent isotope is eluted.

FIG. 2 is a cross-sectional view taken through the left side of the unit and shows shelf 22 on which the elution vial is placed for filling. Member 24 serves the dual purpose of providing a cover for the shielded column 26, saline reservoir, not shown, and the conduit means, also not shown, and also serves as a readily available storage point on the outer surface of the unit for elution vials and/or other materials which may be needed in connection with the generator. Lead shield 26 is disposed in the bottom of the unit 10 and is maintained in place by members 28 and 30. The cross-sectional view of the shield shows cavity 32 in which the generator column is disposed. Shield cover 34 fits on top of bottom portion 26 and provides complete shielding for the column.

The generator shield is designed to give maximum protection from radiation and yet minimize the weight of the entire unit. Cover 34 of the generator shield has a center male member 36 which fits into the orifice of the bottom portion of the shield. The upper surface of bottom shield 26 has two channels 38 which communicate from the outer surface to the inner cavity wherein the generator is contained. The shield cover has complimentary protruding members 40 which fit into the channels yet allowing room for the conduit means to enter and leave the shielded generator.

Figure 3:
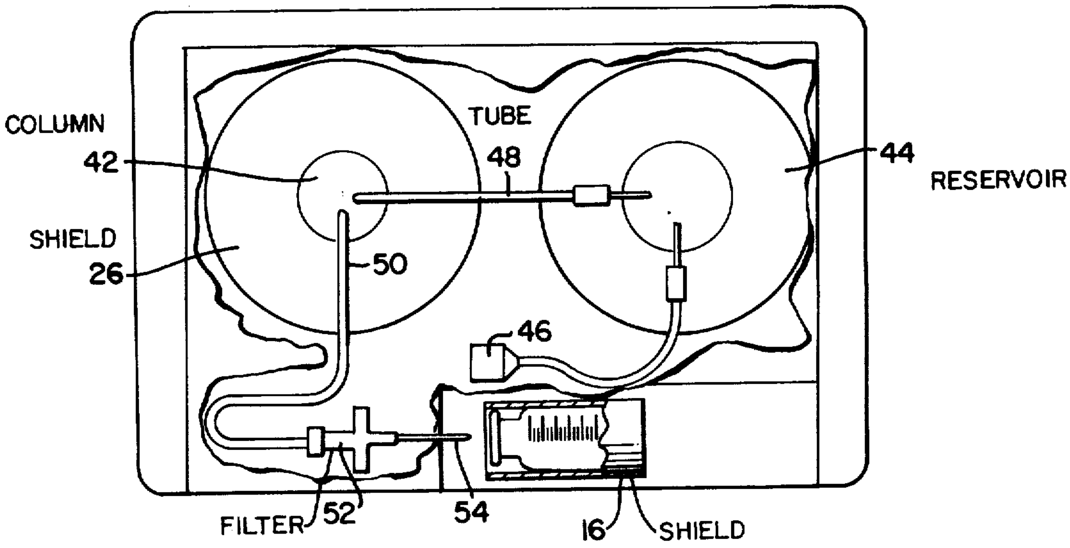
FIG. 3 is a partially cut-away view of the top of the generator system and shows the generator, eluant reservoir and elution vial.

With further reference to the drawings, FIG. 3 is a partially cut away top view of the generator system of this invention. Column 42 is contained within shield 32 and is adjacent to saline reservoir 44. The reservoir is fitted with a one-way check valve 46 containing a sterile-filter which permits air to enter the reservoir as the eluant is drawn into the column 42 by means of tube assembly 48. Both check valve 46 and tube assembly are connected to the reservoir 44 by sterile means, such as by means of a needle through the sealed rubber stopper of the reservoir. The tube assembly 48 passes through channel 38 in the shield and into the top of generator 42. The eluate passes out of the bottom of the column and up around the column and out channel 38. The sterility of the system is maintained by having pierceable system on both the top and bottom of the generator column. The eluted radioisotope passes from the shielded generator by tube means 50 to the outside of the generator system where it is shielded by second shield 18 as shown in FIG. 1. As previously indicated, the second shield 18 can be hinged at its upper end to the organizer tray or it can be slidably mounted to traverse the shelf 22 containing the elution vial. The tube means 50 conducts the eluted radioisotope through a sterile filter 52 such as a mullipore filter, to the terminus of the system. The filter is fitted with a sterline closure not shown which can be removed for attachment of needle 54. The generator system operates by means of the vacuum in the elution vial and the check valve 46 on the saline reservoir when the system of the vial is pierced by needle 54 saline is drawn through the tube assembly conduit means into the generator where the isotope is eluted and out through the filter into the shielded vial.

In its broad aspect, the invention is directed to a system for dispensing sterile solutions containing radioisotopes such as technetium-99m and a method for its use. The generator system is comprised of, in combination, 1. A housing fitted with carrying means, and having contained within said housing:
   a. A radioisotope generator having disposed therein molybdenum-99, said generator being contained within a shielded container having a bottom portion in which is disposed said generator, and a top portion which is engagement with said bottom portion, said bottom portion having female channel means on its top surface for ingress and egress of conduit means which carry eluant to said generator and eluate from said generator, said top portion having male protruding means on its bottom surface which engage said channel means to further shield said conduit means, the outermost ends of said top portion and said bottom portion being tapered to a lesser diameter than at said point wherein said top and bottom portions are in engagement,
   b. A reservoir of eluant disposed next to said shielded container and having disposed thereon a sterile, one-way check value communicating to the atmosphere,
   c. First conduit means communicating from said reservoir through said female channel means and into one end of said generator and through said female channel means to the exterior of said housing,
2. A shelf traversing the front exterior of said housing, a portion of which is shielded by movable exterior shielding means,
3. A shielded elution vial into which said eluate is dispensed, and
4. Filter means disposed at a point between said vial and said second conduit means.

The system of this invention provides a compact portable unit for dispensing sterile solutions of radioisotopes such as technetium-99m. The entire unit can fit into an area as small as 13 by 9.5 inches and stands only about 10.5 inches in height. It can easily be moved from one place to another within the laboratory or industrial location by grasping the upper flanged edges as shown in FIG. 1. Another unique feature of the unit is that both the shielded container with the generator and the eluant reservoir can be easily lifted out of the housing together by detaching cover 24 and lifting them out by means of handle 12. Although not shown in the drawings, the handle can contain a tray or have two rings attached thereto into which the shielded container and eluant reservoir fit.

The generator column itself, which contains the radioisotope, can be one of several known in the art. However, due to the small size used in the present system, only fission product molybdenum is employed. In practice, the systems of this invention will contain 100, 200, or 300 millicuries of the radioisotope as prepared in accordance with U.S. Pat. No. 3,799,883.

In practice, a convenient size saline reservoir is 500 milliliters. The reservoir itself can be contained within a cushioned support, such as foamed polystyrene to prevent breakage during transit. The saline employed in U.S.P. injection sodium chloride formally called normal saline.

As previously indicated, sterility of the entire system is maintained. The check valve which admits air to the reservoir to displace the saline solution passes through a filter. All of the conduit means and any connections which they may have are assembled or connected under aseptic conditions. Additionally, just prior to entering the elution vial the eluate passes through a filter.

The housing of the generator system can be comprised of a variety of materials. For example, it can be comprised of metal, plastic or a combination thereof. The housing and handle will, of course, have to be of sufficient strength to support the shielded generator which will usually be comprised of lead. As indicated in FIG. 1, the top outer portion can be recessed to provide a convenient tray for vials or other articles which may be needed.

In using the system to dispense the eluate, a sterile needle is attached to the second conduit means just after the filter. When not being used, a sterile cover is kept in place over this end. An evacuated eluation vial contained in its own shielded container is moved along the shelf so that its end containing the piercable septum lines up with the needle. The exterior shield of the system is positioned so that it covers the exterior end of the second conduit, filter, and needle. The convenient method is to have an L-shaped shield, the upper end of which is hinged to the housing. The shield can then be lifted up to attach the needle. Alternatively, the shield can be slidably mounted so that it can tranverse the length of the shelf. By pushing the vial into the needle, piercing the septum, the vacuum in the vial pulls through eluant from the reservoir, through the generator and into the vial itself.

Although the invention has been illustrated by the preceding drawings and discussion, it is not to be construed as being limited to the materials disclosed therein, but rather the invention relates to the generic area as hereinbefore described. Various modifications thereof can be made without departing from the spirit and scope thereof.

What is claimed is:

1. A self-contained, portable system for dispensing sterile, non-pyrogenic, isotonic solutions containing technetium-99m, which system is comprised of, in combination:

1. A housing fitted with carrying means, and having contained within said housing:

a. A radioisotope generator having disposed therein molybdenum-99, said generator being contained within a shielded container having a bottom portion in which is disposed said generator, and a top portion which is in engagement with said bottom portion, said bottom portion having female channel means on its top surface for ingress and egress of conduit means which carry eluant to said generator and eluate from said generator, said top portion having male protruding means on its bottom surface which engage said channel means to further shield said conduit means, the outermost ends of said top portion and said bottom portion being tapered to a lesser diameter than at said point wherein said top and bottom portions are in engagement, b. A reservoir of eluant disposed next to said shielded container and having disposed thereon a sterile, one-way check valve communicating to the atmosphere, c. First conduit means communicating from said reservoir through said female channel means and into one end of said generator, second conduit means communicating from the other end of said generator and through said female channel means to the exterior of said housing, 2. A horizontal shelf traversing the front exterior of said housing, a portion of which is shielded by movable exterior shielding means, 3. A shielded elution vial into which said eluate is dispensed, and 4. Filter means disposed at a point between said vial and said second conduit means.

2. The system of claim 1 wherein the upper edges of said housing are flanged outwardly to provide said carrying means.

3. The system of claim 1 wherein said shielded container and said eluant reservoir are fitted with means to facilitate removing them from said housing.

4. The system of claim 1 wherein said molybdenum-99m is contained on an alumina substrate in said generator.

5. The system of claim 1 wherein said molybdenum-99 is fission product molybdenum-99.

6. The system of claim 1 wherein said shielded container is comprised of lead.

7. The system of claim 1 wherein eluant is isotonic saline solution.

8. The system of claim 1 wherein said conduit means are comprised of plastic tubing.

9. The system of claim 1 wherein said conduit means are connected by sterile couplings.

10. The system of claim 1 wherein said filter means is a MILLIPORE filter.

11. The system of claim 1 wherein said generator, eluant reservoir and elution vial all have sterile, piercable septa.

12. The system of claim 11 wherein said conduit means are connected to said generator, eluant reservoir and elution vial by sterile needles which pierce said septa.

13. A process for the preparation of a sterile, non-pyrogenic isotonic solution containing technetium-99m which comprises dispensing said solution from the system of claim 1 by attaching to said second conduit means thereof, an evacuated elution vial.

* * * * *